Patented July 7, 1942

2,288,805

UNITED STATES PATENT OFFICE 2,288,805

METHOD OF PRODUCING DETERGENTS

Torsten Hasselstrom, Savannah, Ga., assignor to G & A Laboratories, Inc., Savannah, Ga., a corporation of Georgia No Drawing. Application February 8, 1940, Serial No. 317,994

2 Claims. (Cl. 260—98)

This invention relates to an improved method of producing a detergent and wetting agent.

In my U. S. Patent 2,121,033, issued June 21, 1938, the method of preparation of a detergent and wetting agent from a resin known to the trade as Hyex resin and prepared in accordance with the process disclosed in U. S. Patent 2,154,629, issued April 18, 1939 to Edwin R. Littmann, was described. The method involved treatment of the Hyex resin with a sulfonating agent and the product was described as a sulfonic acid.

Said U. S. Patent 2,154,629 discloses the treatment of compounds containing the hydrocarbon nucleus of abietic acid so as to decrease their apparent unsaturated character, and possibly increase their melting points and improve their color, and also relates to the treated products so formed. Said treatment comprises contacting the abietyl compound with a catalyst of the type hereinafter described, in a manner adapted to exclude the possibility of reaction between the abietyl compound and any other material. As a result of such treatment, a change in the chemical and physical properties of the abietyl compound, believed to be due to a simultaneous dehydrogenation and hydrogenation by the heating of the abietyl compound in the presence of the hydrogenation catalyst only, e. g. palladium, takes place and the resulting product will be found to have a greatly decreased apparent unsaturation, in some cases a higher melting point and improved color.

The catalysts which may be used in effecting this change or intra- or intermolecular rearrangement are those which catalyze the hydrogenation of unsaturated organic compounds, for example, any of the nickel, platinum, palladium or copper chromite catalysts used in such hydrogenation. Preferably a palladium catalyst will be employed in the method according to this invention, for example, a catalyst comprising 40% by weight of palladium supported on fibrous abbestos.

Desirably, the abietyl compound and the catalyst will be brought into contact at an elevated temperature, in order that a practical reaction rate may be obtained, but the use of an elevated temperature is not necessary for the accomplishment of the desired results. The optimum temperature range for the most satisfactory results is from about 150° C. to about 250° C. Since thorough contact between catalyst and abietyl compound can best be obtained when the abietyl compound, when not a liquid at the temperature employed, will be heated to render it liquid.

It is essential that the treatment of the abietyl compound be carried out in such a manner that no reaction can occur between the abietyl compound and any other material. No added hydrogen is present during the treatment. While the treatment may be carried out in the presence of air, it is preferable to treat the abietyl compound in an atmosphere of more inert gas, for example, carbon dioxide, nitrogen, etc.

The following table shows comparative values of various chemical constants for treated and untreated abietyl compounds:

|  | "I" rosin, before treatment | "I" rosin, after treatment |
|---|---|---|
| Thiocyanate No | 90–96 | 10–14. |
| Melting point, drop method | 80–85° C | 85–90° C. |
| Color | | Slightly bleached. |
| Saponification No | 168–172 | 167–171. |
| Oxygen absorption, per cent of total absorbed by 2 double bonds | 40% | 1%. |

The decrease in the thiocyanate number and in oxygen absorption exhibited by the treated "I" rosin is proof of the marked decrease in apparent chemical unsaturation produced by treatment in accordance with this invention. The fact that the saponification number is practically the same for both treated and untreated rosins is proof that the carboxyl groups of the rosin acids have been unchanged by the treatment, which must, therefore, effect the hydrocarbon nucleus only.

Now, in accordance with this invention, an improved method is described of producing a sulfonic acid derivative from the resin prepared by heat-treating wood or gum rosin in the presence of a hydrogenation catalyst, such as palladium, and in the absence of added substances capable of reducing the degree of unsaturation of the rosin, such resin being produced in accordance with the process described in U. S. 2,154,629 to Edwin R. Littmann. My new method provides many advantages in the preparation of the sulfonic acid over the methods broadly described and claimed in my above-identified patent. By my improved method of preparation the sulfonic acid derivative may be isolated in a higher state of purity and by a more simplified process. My improved process also is more readily adapted to commercial production.

The first step of my present invention comprises sulfonation of the Hyex resin produced as defined above with concentrated sulfuric acid, if desired in a suitable solvent attacked or unattacked by concentrated sulfuric acid, e. g., carbon tetrachloride, liquid sulfur dioxide, petroleum distillates, saturated and/or unsaturated hydrocarbons, preferably of the aromatic and/or hydroaromatic series, although I may employ unsaturated aliphatic hydrocarbons, or mixtures thereof.

As sulfonating agent I preferably employ sulfuric acid of specific gravity about 1.84. although I may employ somewhat lower or somewhat higher strengths, even to fuming sulfuric acid, or chlorsulfonic acid or sulfur trioxide as the sulfonating agent.

The sulfonation mixture obtained is then treated with water at a temperature below about 100° C. As a result of this treatment, a brownish precipitate is separated. After washing to free residual sulfuric acid, the brownish precipitate is treated with a suitable calcium salt such as, for example, calcium carbonate, calcium bicarbonate, calcium chloride, etc., so as to form the calcium salt of the sulfonic acid of the Hyex resin contained in the brownish product. The calcium salt of the sulfonic acid may then be purified by any convenient means such as by extracting with an organic solvent, as for example, ethyl acetate, benzol, carbon tetrachloride, tetrachlorethane, etc. The salt may then be acidified so as to free the sulfonic acid of Hyex resin in purified form.

The quality of the sulfonic acid obtained by following my improved procedure involving formation of the calcium salt of the sulfonic acid as a means of separation from the residual sulfonation materials is superior to that obtained by employing the hot water extraction procedure described in my prior patent.

As an example of the procedure for carrying out my invention, the following may be cited:

Example I

One hundred parts by weight of the treated I rosin obtained as described above by heat-treating I wood rosin in the presence of palladium were mixed with 368 parts by weight of sulfuric acid of sp. gr. 1.84 at a temperature of 15 to 35° C. for about 30 minutes. The mixture was then poured onto 200 parts by weight of cracked ice. The temperature was not allowed to go above 20° C. Then 200 parts by weight of water were added. A brownish precipitate separated and was filtered off, washed with water until substantially free of residual sulfuric acid. About 10 parts by weight of calcium carbonate and 75 parts by weight of water were then added to the precipitate and the mixture was stirred until neutralization of the sulfonic acid contained in the original brownish precipitate was complete. The precipitate of the calcium salt of the sulfonic acid was then filtered off and extracted with a 2:1 mixture by volume of ethyl acetate and water to remove extraneous matter. The solvent was evaporated from the solvent extract, thereby freeing a neutral resin material. The purified calcium salt remaining was then acidified with dilute sulfuric acid. A solution of 10 parts by weight of sodium carbonate in 600 parts by weight of water was then added to the sulfonic acid mixture and the solution filtered to remove calcium sulfate. By acidification of the filtrate with dilute sulfuric acid, the sulfonic acid of the Hyex resin precipitated and was removed by filtration. The sulfonic acid had a M. P. of 223–224° C. (with decomposition).

It will be appreciated that the details and proportions set forth in the above are illustrative only, and that the invention as broadly described and claimed is in no way limited thereby.

The sulfonic acid product will be found variously adapted to uses as an improved detergent and wetting out agent, e. g., in the scouring of textiles, as a soap assistant, etc.

What I claim and desire to protect by Letters Patent is:

1. The method of preparing a purified sulfonic acid which comprises treating a resin prepared by heat-treating rosin in the presence of a hydrogenation catalyst and in the absence of added substances capable of reducing the degree of unsaturation of the rosin with a sulfonating agent under conditions which bring about sulfonation of the said resin, treating the resulting sulfonated resin mixture with water at a temperature below about 100° C. to precipitate resin sulfonic acid in crude form, washing out excess sulfonating agent from the precipitate, treating the crude resin sulfonic acid with a calcium salt reactive therewith to form a calcium salt of the said resin sulfonic acid as a precipitate phase, extracting essentially neutral resin material from the calcium salt maintained in the insoluble state with an organic solvent for the neutral resin material, adding acid to the purified resin sulfonic acid calcium salt to form the free resin sulfonic acid and a water-insoluble calcium salt, and separating the calcium salt from the resin sulfonic acid by dissolving the latter in aqueous alkali.

2. The method of preparing a purified sulfonic acid which comprises treating a resin prepared by heat-treating rosin in the presence of a hydrogenation catalyst and in the absence of added substances capable of reducing the degree of unsaturation of the rosin with concentrated sulfuric acid under conditions which bring about sulfonation of the said resin, treating the resulting sulfonated resin mixture with water at a temperature below about 100° C. to precipitate resin sulfonic acid in crude form, washing out excess sulfuric acid from the precipitate, treating the crude resin sulfonic acid with a calcium salt reactive therewith to form a calcium salt of the said resin sulfonic acid as a precipitate phase, extracting essentially neutral resin material from the calcium salt maintained in the insoluble state with an organic solvent for the neutral resin material, adding acid to the purified resin sulfonic acid calcium salt to form the free resin sulfonic acid and a water-insoluble calcium salt, and separating the calcium salt from the resin sulfonic acid by dissolving the latter in aqueous alkali.

TORSTEN HASSELSTROM.